United States Patent Office 3,135,776
Patented June 2, 1964

3,135,776
PREPARATION OF BENZENE TRICARBONYLS OF GROUP VIB METALS
George G. Ecke, Penn Hills Township, Allegheny County, Pa., assignor to Ethyl Corporation, New York, N.Y., a corporation of Virginia
No Drawing. Filed Mar. 7, 1961, Ser. No. 93,858
7 Claims. (Cl. 260—429)

The invention relates to a process of preparing benzene metal tricarbonyl compounds, the metal being a metal of group VIB of the periodic table. In particular, the invention relates to a process of reacting an alloocimene with a chromium, molybdenum or tungsten hexacarbonyl compound. In the reaction, the alloocimene cyclizes to a benzene structure to form a product from the cyclized benzene which may be separated and recovered.

It is therefore an object of the present invention to provide a novel reaction for forming benzene metal tricarbonyl compounds wherein the metal is chromium, molybdenum or tungsten.

Another object is to recover the benzene portion of the compound thus formed.

The alloocimenes used in the present invention have the general formula:

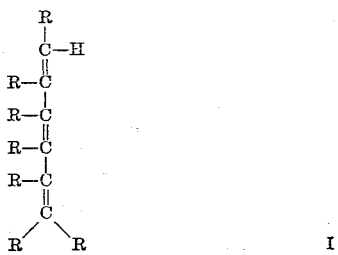

in which each of the R groups is hydrogen or a univalent hydrocarbon group containing from one to about eight carbon atoms and can be alkyl, alkenyl, cycloalkyl, cycloalkenyl or aryl groups. The preferred compound is alloocimene itself (2,6-dimethyl octatriene-2,4,6) which has the formula:

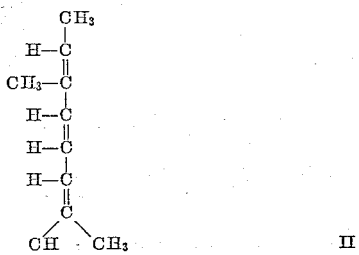

During the course of the reaction with the metal carbonyl compound, the hydrogen on the number 7 carbon (the second carbon atom from the top in Formula II) splits off and there is also split off one of the two methyl groups on the number 2 carbon of the same formula. These two carbon atoms then become linked together so that the alloocimene cyclizes to form 1,2,3-trimethylbenzene metal tricarbonyl, the metal being one of the metals heretofore mentioned. It is preferred to have the two substituents on the number 2 carbon (of Formula II) identical so that the structure of the cyclized product will be unequivocal. If they are different, the one more loosely bonded is split off, but in general at least a small amount of both possible products is formed.

To restate the general course of the reaction it can be represented as follows:

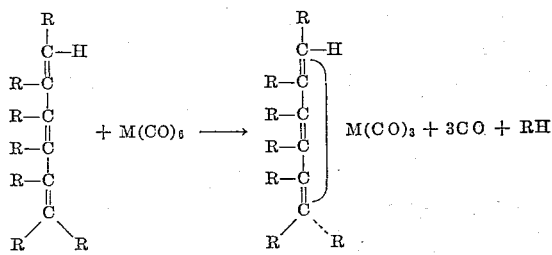

The metals of group VIB of the periodic table coordinate with twelve electrons all of which can be donated by carbonyl groups, as in the hexacarbonyl compounds, or six can be donated by a benzene ring and the remainder by carbonyl groups. This coordinating tendency although not very strong, is sufficient to cause the above cyclizing actions even though this involves the splitting off of an R group.

The benzene metal tricarbonyl product of the above reaction can be further reacted with carbon monoxide, or another displacing agent, to liberate the benzene compound and reform the hexacarbonyl or similar metal compound, depending upon the nature of the displacing agent. This is more completely described in copending application Serial No. 4,018, filed January 22, 1960. When carbon monoxide is used as the displacing agent, the metal hexacarbonyl reactant is regenerated and can be recycled for use to cause additional cyclizing.

In the process of the present invention, reaction conditions are not critical. The two reactants need merely be brought together at reaction temperatures. Agitation is helpful and the reaction may be conducted in an inert atmosphere or in air if desired. In general, any nonreactive solvent can be used although no solvent is necessary. When the alloocimene is liquid it acts as a solvent for the hexacarbonyl reactant, but the reaction of the present invention will take place between a solid alloociment and a solid hexacarbonyl, although the rate of reaction would then be quite low. The following examples illustrate the present invention but are not to be construed as limiting its scope.

*Example 1*

A mixture of 11 g. (0.05 mole) of chromium hexacarbonyl and 27.2 g. (0.2 mole) of alloocimene was refluxed for six hours (180–235° C.). During this time it evolved 40% of the theoretical amount of carbon monoxide for displacement of 3 carbonyl groups from the hexacarbonyl. The resulting mixture was cooled, stirred with twice its volume of petroleum ether and filtered. The filtrate was yellow colored and was chromatographed on alumina using petroleum ether and then ethyl ether as eluants. The yellow ethyl ether eluate fraction yielded yellow crystals on evaporation. After sublimation the crystals melted at 102–104° C. Analysis of the crystals gave the following results:

Calcd. for $C_{12}H_{12}CrO_3$: C, 56.3%; H, 4.69%; Cr. 20.3%. Found: C, 56.6%; H, 4.49%; Cr, 20.3%.

The crystals were shown to be 1, 2, 3-trimethyl benzene chromium tricarbonyl by a mixed melting point with an authentic sample, independently synthesized from hemimellitine in the manner described in copending application Serial No. 720,083, filed March 10, 1958, as well as by comparison of the infrared and ultraviolet spectra of the two materials. 1,2,4-trimethyl benzene chromium tricarbonyl was also prepared from 1,2,4-trimethyl benzene, and shown to have a melting point of 48–49.5° C. The large difference between its melting point and that of the 1,2,3-trimethylbenzene chromium tricarbonyl was further evidence in support of structure.

*Example 2*

A mixture of 2.7 grams (0.01 mole) of 5,8-dibutyl dodecatriene-4,6,8 with 1.3 grams (0.005 mole) of molybdenum hexacarbonyl and 20 cc. of decalin is refluxed for 10 hours. During this time, it evolves 70% of the theoretical amount of carbon monoxide for displacement of 3 carbonyl groups from the hexacarbonyl. The resulting mixture is cooled, stirred with four times its volume of ethyl ether and filtered. The filtrate is chromatographed on alumina as in Example 1, and 1,6-dipropyl-2,5-dibutyl benzene molybdenum tricarbonyl is recovered and identified by analysis.

*Example 3*

A mixture of 3 grams (0.022 mole) of 3,4-diethylhexatriene-1,3,5 and 5.3 grams (0.015 mole) of tungsten hexacarbonyl is refluxed for 20 hours, cooled, stirred with three times its volume of pentane and filtered. There is substantially no residue on the filter paper, showing that the reaction is essentially complete, and the filtrate deposits 1,2-diethyl benzene tungsten tricarbonyl crystals upon being placed in a cold box at —20° C.

*Example 4*

A mixture of 4 grams (0.03 mole) of decatriene-3,5,7 with 6.6 grams (0.03 mole) of chromium hexacarbonyl and 10 cc. 2,2,4-trimethylpentane is refluxed for 16 hours, then cooled and treated as in Example 1. Yellow crystals of 1,2-diethyl benzene chromium tricarbonyl are obtained.

*Example 5*

A mixture of 3.1 grams (0.033 mole) of 2-methyl hexatriene-1,3,5 with 13 grams (0.05 mole) of molybdenum hexacarbonyl and 30 cc. diethyleneglycol dimethylether is refluxed for 18 hours and after removing excess molybdenum hexacarbonyl as in Example 1, toluene molybdenum tricarbonyl is recovered from the remaining reaction mixture by placing it in the cold box at —10° C.

*Example 6*

A mixture of 1.6 grams (0.015 mole) of 3-methyl heptatriene-2,4,6 and 10.6 grams (0.03 mole) of tungsten hexacarbonyl is refluxed in a nitrogen atmosphere for 10 hours, cooled and treated as in Example 1. A good yield of o-xylene tungsten tricarbonyl is obtained. When this product is subjected to a carbon monoxide pressure of 5,000 pounds per square inch in an autoclave held at a temperature of 150° C. for 1½ hours and the autoclave then vented, o-xylene is recovered from the vented vapors in an ice trap and tungsten hexacarbonyl is regenerated and can be washed out of the autoclave.

Similar reactions take place with other alloocimenes including 2-allyl-hexatriene-1,3,5 and 1-cycloheptyl heptatriene 2,4,6 and 1,2,3-trioctyl-6-diethyl hexatriene-1,3,5 and the like. These alloocimenes can be considered as hexatrienes in which all three double bonds are conjugated and in which at least one of the terminal hexatriene carbons carries a hydrogen. As indicated, all kinds of hydrocarbyl substituted hexatrienes of this type can be used. Halogen-substituted and lower alkyl ethers of alloocimenes are also suitable.

The cyclizing reaction of the present invention takes place over a wide range of temperatures. Below about 60° C. the reaction velocity is extremely slow and at about 100° C. the velocity reaches practical proportions. Preferred temperatures are between about 120 and 250° C. At temperatures in the upper portion of this range the alloocimenes tend to decompose apparently by contact with oxygen in the air so that for best utility of these reactants the reaction can be carried out in an inert atmosphere, as in Example 6. The maximum practical temperature for the desired reaction is that at which the alloocimenes decompose too rapidly, and even in inert atmospheres this is about 275° C.

Diluents or solvents can be used in the reaction, although they are not essential. When used they can help to establish the reaction temperature, by selecting a diluent having a boiling range at the desired temperatures (below the boiling range of the alloocimenes) and refluxing the reaction mixture. Hydrocarbons, ethers and chlorinated hydrocarbons make effective diluents and in addition to those of the above examples, decalin, diethyl ether of diethylene glycol, heavy alkylate and kerosene are suitable.

Without diluent or solvent, the reactants can also be refluxed but then the refluxing temperature changes appreciably as the reaction proceeds. Refluxing is not essential inasmuch as the same reaction velocity is obtained by reaction temperatures reached in any other manner, as by immersing the reaction container in a bath of diphenyl suitably heated. The presence of a diluent or solvent also seems to slow down the decomposition of the alloocimenes and is desirable for this reason.

The time during which the reaction of the present invention takes place can range from about 1 to 50 hours or more. While a ½ hour treatment at 250° C. will generally produce a detectable yield, it is generally too small to be practical. The reactants can be mixed in any desired proportions and excesses of either reactant do not interfere. Mole proportions ranging from 10:1 to 1:10 are suitable although it is generally preferred to use only a small (20%) excess of the alloocimene to take care of the small amount of decomposition that it undergoes.

The benzene metal tricarbonyls produced by the cyclizing reaction have other uses in addition to providing a source for the cyclized hydrocarbons. They decompose fairly readily at temperatures of about 400° C., and when vapors of these compounds are heated to that temperature they deposit the free metal. The deposit takes the form of a metallic mirror of good electrical conductivity and is suitable for plating other metals or nonmetals such as ceramics. The tricarbonyl compounds can also be used to supply these metals in soluble form for use as additives to fuels such as diesel fuel, domestic heating oil, jet fuel and gasoline. Such additives improve the combustion of such fuels.

Obviously, many modifications and variations of the present invention are possible in the light of the above teachings. It is, therefore, to be understood that within the scope of the appended claims the invention may be practiced otherwise than as specifically described.

What is claimed is:

1. The process of preparing a benzene metal tricarbonyl compound which comprises reacting an alloocimene with a metal hexacarbonyl wherein the metal is a metal of group VIB of the periodic table.

2. The process of claim 1 in which the alloocimene is 2,6-dimethyl octatriene-2,4,6 and the tricarbonyl compound prepared is the 1,2,3-trimethylbenzene metal tricarbonyl.

3. The process of claim 1 wherein the metal is chromium.

4. The process of claim 1 wherein the metal is molybdenum.

5. The process of claim 1 wherein the metal is tungsten.

6. The process of cyclizing an alloocimene which process comprises reacting the alloocimene with a metal hexacarbonyl wherein the metal is a metal of group VIB of the periodic table, to form the corresponding benzene metal tricarbonyl, and then reacting said benzene metal tricarbonyl compound with an excess of carbon monoxide to reconvert the metal tricarbonyl compound back to the metal hexacarbonyl and to simultaneously liberate the benzene portion of the compound as the cyclized form of the alloocimene.

7. The process according to claim 6 in which the alloocimene is 2,6-dimethyl octatriene-2,4,6, the tricarbonyl compound is 1,2,3-trimethylbenzene chromium tricarbonyl and the liberated cyclized product is 1,2,3-trimethyl benzene.

No references cited.

UNITED STATES PATENT OFFICE
CERTIFICATE OF CORRECTION

Patent No. 3,135,776                                             June 2, 1964

George G. Ecke

It is hereby certified that error appears in the above numbered patent requiring correction and that the said Letters Patent should read as corrected below.

Column 1, lines 43 to 53, formula II should appear as shown below instead of as in the patent:

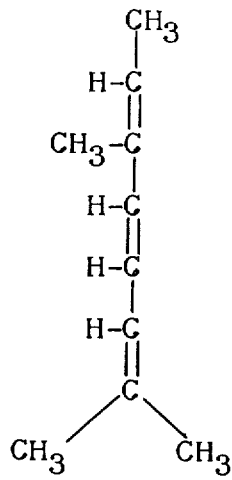

column 2, lines 43 and 44, for "alloociment" read -- alloocimene --; column 3, line 59, for "cented" read -- vented --; line 64, for "1,2,3-trioctyl-6-diethyl" read -- 1,2,3-trioctyl-6,6-diethyl --; column 4, line 8, for "decompe" read -- decompose --.

Signed and sealed this 27th day of October 1964.

(SEAL)
Attest:

ERNEST W. SWIDER                                  EDWARD J. BRENNER
Attesting Officer                              Commissioner of Patents